US012743300B2

(12) United States Patent
Wang et al.

(10) Patent No.: US 12,743,300 B2
(45) Date of Patent: Sep. 22, 2026

(54) DOUBLE-FLASH SWITCHING DEVICE AND SERVER

(71) Applicant: SUZHOU METABRAIN INTELLIGENT TECHNOLOGY CO., LTD., Suzhou (CN)

(72) Inventors: Dong Wang, Suzhou (CN); Chao Gao, Suzhou (CN)

(73) Assignee: Suzhou Metabrain Intelligent Technology Co., Ltd., Suzhou (CN)

( * ) Notice: Subject to any disclaimer, the term of this patent is extended or adjusted under 35 U.S.C. 154(b) by 457 days.

(21) Appl. No.: 18/566,641

(22) PCT Filed: May 26, 2022

(86) PCT No.: PCT/CN2022/095385
§ 371 (c)(1),
(2) Date: Dec. 2, 2023

(87) PCT Pub. No.: WO2023/109018
PCT Pub. Date: Jun. 22, 2023

(65) Prior Publication Data

US 2024/0264860 A1 Aug. 8, 2024

(30) Foreign Application Priority Data

Dec. 15, 2021 (CN) ........................ 202111529170.5

(51) Int. Cl.
*G06F 3/00* (2006.01)
*G06F 9/48* (2006.01)
(Continued)

(52) U.S. Cl.
CPC ........ *G06F 9/4843* (2013.01); *G06F 11/1417* (2013.01); *G06F 11/2094* (2013.01)

(58) Field of Classification Search
CPC ........................................................ G06F 9/48
See application file for complete search history.

(56) References Cited

U.S. PATENT DOCUMENTS 5,446,439 A * 8/1995 Kramer .................... G08B 7/06 315/129
10,101,919 B2 * 10/2018 Qin ..................... G06F 13/4282
(Continued)

FOREIGN PATENT DOCUMENTS

CN 102789408 A 11/2012
CN 105159719 A 12/2015
(Continued)

OTHER PUBLICATIONS

Nobuaki, Circuit Techniques for 1.5-V Power Supply Flash Memory. (Year: 1997).*
(Continued)

*Primary Examiner* — Lechi Truong
(74) *Attorney, Agent, or Firm* — IPro, PLLC

(57) ABSTRACT

A double-Flash switching device and a server is provided by the present application. The device includes: a target chip; a first Flash chip and a second Flash chip, wherein they are individually burnt with a firmware of the target chip, and are connected to the target chip by using a bus; a jumper cap, wherein the jumper cap has a first pin, a second pin and a third pin, the first pin is connected to an enabling pin of the first Flash chip, the second pin is connected to ground, and the third pin is connected to an enabling pin of second Flash chip; and an insulated-gate-type field-effect transistor, wherein two different electrodes of the insulated-gate-type field-effect transistor are connected to first pin and third pin, and insulated-gate-type field-effect transistor is configured to be switched on or switched off to cause two different electrodes to have different electrical levels.

14 Claims, 3 Drawing Sheets

(51) Int. Cl.
*G06F 11/14* (2006.01)
*G06F 11/20* (2006.01)

(56) References Cited

U.S. PATENT DOCUMENTS

| | | | | |
|---|---|---|---|---|
| 2002/0181289 | A1 | 12/2002 | Matsubara et al. | |
| 2009/0158024 | A1 | 6/2009 | Hung et al. | |
| 2014/0006832 | A1 * | 1/2014 | Wu | G06F 1/3268 713/324 |
| 2014/0024249 | A1 * | 1/2014 | Adams | F21V 23/06 439/509 |
| 2016/0364244 | A1 * | 12/2016 | Kumar | G06F 9/441 |
| 2019/0065210 | A1 | 2/2019 | Han | |
| 2023/0188104 | A1 * | 6/2023 | Xu | H03F 3/245 330/295 |

FOREIGN PATENT DOCUMENTS

| | | | | |
|---|---|---|---|---|
| CN | 110928585 | A | | 3/2020 |
| CN | 111124510 | A | | 5/2020 |
| CN | 113918389 | A | | 1/2022 |
| TW | 201216158 | A | * | 4/2012 |

OTHER PUBLICATIONS

Wu, Bing, et al. "Dualfs: A coordinative flash file system with flash block dual-mode switching." 2020 IEEE 38th International Conference on Computer Design (ICCD). IEEE, 2020.

Ge Gao. "Design of storage and transmission based on multi-sensor data acquisition system." A thesis for masters degree. Xidian University. May 2018.

* cited by examiner

DOUBLE-FLASH SWITCHING DEVICE AND SERVER

CROSS REFERENCE TO RELEVANT APPLICATIONS

The present application claims the priority and the benefit of the Chinese patent application filed on Dec. 15, 2021 before the Chinese Patent Office with the application number of 202111529170.5 and the title of "DOUBLE-FLASH SWITCHING DEVICE AND SERVER", which is incorporated herein in its entirety by reference.

TECHNICAL FIELD

The present application relates to the technical field of servers and, more particularly, to a double-Flash switching device and a server.

BACKGROUND

As application scenes of servers become increasingly complex, people have higher and higher requirements on the stability and the reliability of the operation of the servers. The basic input output system (BIOS) and the baseboard management controller (BMC) in server systems provide to the servers the setting relevant to the underlying hardware and the control logic. The BIOS, as the basic input output system, is an important bridge connecting the underlying hardware and the upper operating system, and is also the basic guarantee enabling the server to normally start up. Moreover, the BMC, as the out-of-band controller on the mainboard, may ensure the healthy operation of the system by monitoring the operation state of the server system in real time. Therefore, the normal operation of the BIOS and the BMC is of vital importance to the server system. Both of their firmware burning programs are stored in the corresponding Flashes. After the mainboard is powered on, the integrated south bridge (platform controller hub, PCH) and the baseboard management controller (BMC) read their firmwares from the corresponding Flashes, and then they may normally operate.

Currently, the commonly used design is that two Flash chips are disposed on the server for the BIOS and the BMC individually. When the server starts up, the PCH or the BMC starts up from Flash1 by default, and when the Flash1 malfunctions and causes a starting-up failure, the PCH or the BMC is switched to start up from Flash2. Referring to FIG. 1, FIG. 1 shows a schematic diagram of a traditional BMC double-Flash starting-up solution. The chip-selection signal of the BMC is default with CS1 effective, and enables the Flash1, and, when the loading fails, the CS2 signal-level state is modified and switched to the Flash2.

The traditional double-Flash starting-up design has the following defects. Merely when the loading of the default Flash fails, the other Flash may be automatically switched. If the two Flashes are burnt with different firmwares, when the user intends to voluntarily select to use one of the Flashes to start up, it is required to firstly completely load the default Flash, and subsequently reload the firmware in the other Flash again. In this way, in an aspect, the duration of the starting-up is increased; in another aspect, if the loaded firmware which is started up does not match with the hardware configuration, even the normal operation of the server system is affected.

SUMMARY

In view of the above, for the technical problem stated above, it is necessary to provide a double-Flash switching device and a server.

According to the first aspect of the present application, a double-Flash switching device is provided, wherein the device includes:

- a target chip;
- a first Flash chip and a second Flash chip, wherein the first Flash chip and the second Flash chip are individually burnt with a firmware of the target chip, and are connected to the target chip by using a bus;
- a jumper cap, wherein the jumper cap has a first pin, a second pin and a third pin, the first pin is connected to an enabling pin of the first Flash chip, the second pin is connected to ground, and the third pin is connected to an enabling pin of the second Flash chip; and
- an insulated-gate-type field-effect transistor, wherein two different electrodes of the insulated-gate-type field-effect transistor are connected to the first pin and the third pin, and the insulated-gate-type field-effect transistor is configured to be switched on or switched off to cause the two different electrodes to have different electrical levels; and
- the target chip is configured to, based on connection states of the first pin, the second pin and the third pin of the jumper cap, load the firmware from the first Flash chip or the second Flash chip.

In some embodiments, the insulated-gate-type field-effect transistor is an N-channel metal-oxide-semiconductor (NMOS) transistor;

- a drain electrode of the NMOS transistor is connected to a power supply by a first resistor, a gate electrode of the NMOS transistor is connected to the power supply by a second resistor, and a source electrode of the NMOS transistor is connected to the ground; and
- the first pin is connected to the drain electrode of the NMOS transistor, and the third pin is connected to the gate electrode of the NMOS transistor.

In some embodiments, the target chip has an output pin and an input pin, the output pin is connected to the enabling pin of the second Flash chip and the gate electrode of the NMOS transistor, and the input pin is connected to the jumper cap;

- the target chip is configured to detect a state of the jumper cap by using the input pin; and
- the target chip is further configured to, in response to the jumper cap being pulled out or the second pin being not connected to the first pin or the third pin, output a low-level signal or a high-level signal to the second Flash chip by using the output pin.

In some embodiments, the insulated-gate-type field-effect transistor is a P-channel metal-oxide-semiconductor (PMOS) transistor;

- a gate electrode of the PMOS transistor is connected to a power supply by a first resistor, a drain electrode of the PMOS transistor is connected to the power supply by a second resistor, and a source electrode of the PMOS transistor is connected to the ground; and
- the first pin is connected to the gate electrode of the PMOS transistor, and the third pin is connected to the drain electrode of the PMOS transistor.

In some embodiments, the target chip has an output pin and an input pin, the output pin is connected to the enabling pin of the second Flash chip and the drain electrode of the PMOS transistor, and the input pin is connected to the jumper cap;

the target chip is configured to detect a state of the jumper cap by using the input pin; and the target chip is further configured to, in response to the jumper cap being pulled out or the second pin being not connected to the first pin or the third pin, output a low-level signal or a high-level signal to the second Flash chip by using the output pin.

In some embodiments, the device further includes a third resistor, one end of the third resistor is connected to the third pin, and the other end of the third resistor is connected to the ground.

In some embodiments, a magnitude of a resistance value of the third resistor is one hundred ohms to two hundreds ohms.

In some embodiments, a type of the target chip includes one of a baseboard management controller, an integrated south-bridge chip, a graphics card, a network card and an internal memory.

In some embodiments, the firmwares in the first Flash chip and the second Flash chip are different.

According to the second aspect of the present application, a server is further provided by the present application, wherein the server includes the double-Flash switching device stated above. Furthermore, the present application further provides a server.

BRIEF DESCRIPTION OF THE DRAWINGS

In order to more clearly illustrate the technical solutions of the embodiments of the present application or the prior art, the figures that are required to be used to describe the embodiments or the prior art will be briefly described below. Apparently, the figures that are described below are merely some embodiments of the present application, and a person skilled in the art may obtain other embodiments according to these figures without paying creative work.

DESCRIPTION OF THE REFERENCE NUMBERS

10: target chip;

20: first Flash chip;

30: second Flash chip;

40: jumper cap; 41: first pin; 42: second pin; 43: third pin;

Q1: NMOS transistor; Q2: PMOS transistor; G: gate electrode; D: drain electrode; S: source electrode;

R1: first resistor; R2: second resistor; and R3: third resistor.

DETAILED DESCRIPTION

In order to make the objects, the technical solutions and the advantages of the present application clearer, the embodiments of the present application will be described in further detail in combination with the embodiments and the drawings.

It should be noted that all of the expressions of "first" and "second" used in the embodiments of the present application are intended to distinguish two different entities or different parameters that have the same names. It may be seen that "first" and "second" are merely for the convenience of the expression, and should not be construed as a limitation on the embodiments of the present application, which will not be explained in detail in the subsequent embodiments.

Figure 1:
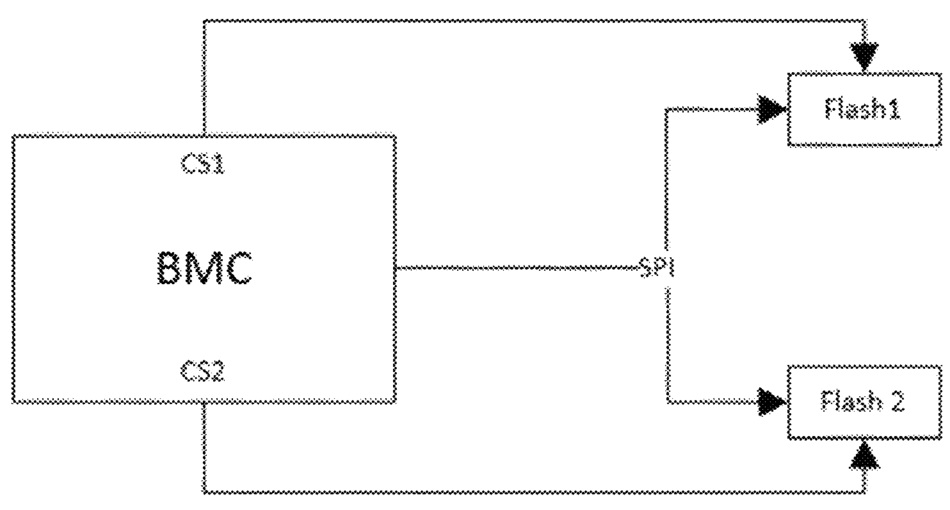
FIG. 1 is a schematic diagram of a traditional BMC double-Flash starting-up solution.
Figure 2:
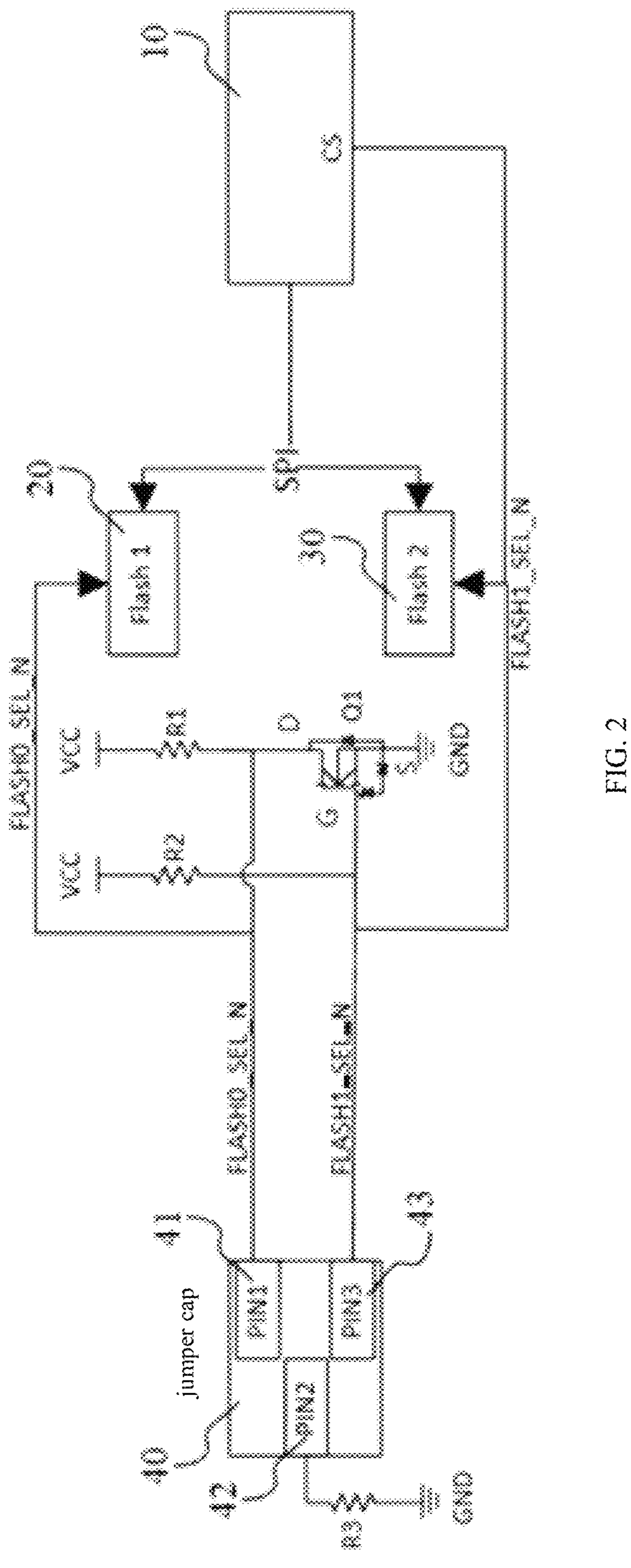
FIG. 2 is a schematic diagram of a structure of a double-Flash switching device according to one or more embodiments of the present application.

In one or more embodiments, referring to FIG. 2, the present application provides a schematic diagram of a structure of a Flash switching device. The device includes:

a target chip 10;

a first Flash chip 20 and a second Flash chip 30, wherein the first Flash chip 20 and the second Flash chip 30 are individually burnt with a firmware of the target chip 10, and are connected to the target chip 10 by using a bus;

a jumper cap 40, wherein the jumper cap 40 has a first pin 41, a second pin 42 and a third pin 43, the first pin 41 is connected to an enabling pin of the first Flash chip 20, the second pin 42 is connected to ground, and the third pin 43 is connected to an enabling pin of the second Flash chip 30; and an insulated-gate-type field-effect transistor, wherein two different electrodes of the insulated-gate-type field-effect transistor are connected to the first pin 41 and the third pin 43, and the insulated-gate-type field-effect transistor is configured to be switched on or switched off to cause the two different electrodes to have different electrical levels.

The target chip 10 is configured to, based on the connection states of the first pin 41, the second pin 42 and the third pin 43 of the jumper cap 40, load the firmware from the first Flash chip 20 or the second Flash chip 30.

In the double-Flash switching device, by adding the jumper cap and the insulated-gate-type field-effect transistor, the first pin of the jumper cap is connected to the enabling pin of the first Flash chip, the second pin is connected to ground, the third pin is connected to the enabling pin of the second Flash chip, the two different electrodes of the insulated-gate-type field-effect transistor are connected to the first pin and the third pin, and the insulated-gate-type field-effect transistor is configured to be switched on or switched off to cause the electrical levels connected to the first pin and the third pin to be different, and then the target chip may, based on the connection states of the pins of the jumper cap, load the firmware from the first Flash chip or the second Flash chip. The jumper cap is used to facilitate the operator to voluntarily select the firmware-loading position according to demands, which avoids Flash switching after powering-on, the flexibility of the firmware loading is improved, the risk of starting-up failures caused by errors in firmware loading is reduced, and the chip starting-up duration is shortened.

In some embodiments, referring to FIG. 2, the insulated-gate-type field-effect transistor is an NMOS transistor Q1;

the drain electrode of the NMOS transistor Q1 is connected to a power supply by a first resistor R1, the gate electrode of the NMOS transistor Q1 is connected to the power supply by a second resistor R2, and the source electrode of the NMOS transistor Q1 is connected to the ground; and the first pin 41 is further connected to the drain electrode of the NMOS transistor Q1, and the third pin 43 is connected to the gate electrode of the NMOS transistor Q1.

In some embodiments, referring to FIG. 2, the target chip 10 has an output pin and an input pin, the output pin is connected to the enabling pin of the second Flash chip 30, and the input pin is connected to the jumper cap 40;

the target chip 10 is configured to detect a state of the jumper cap 40 by using the input pin; and the target chip 10 is further configured to, in response to the jumper cap 40 being pulled out or the second pin 42 being not connected to the first pin 41 or the third pin 43, output a low-level signal or a high-level signal to the second Flash chip 30 by using the output pin.

Figure 3:
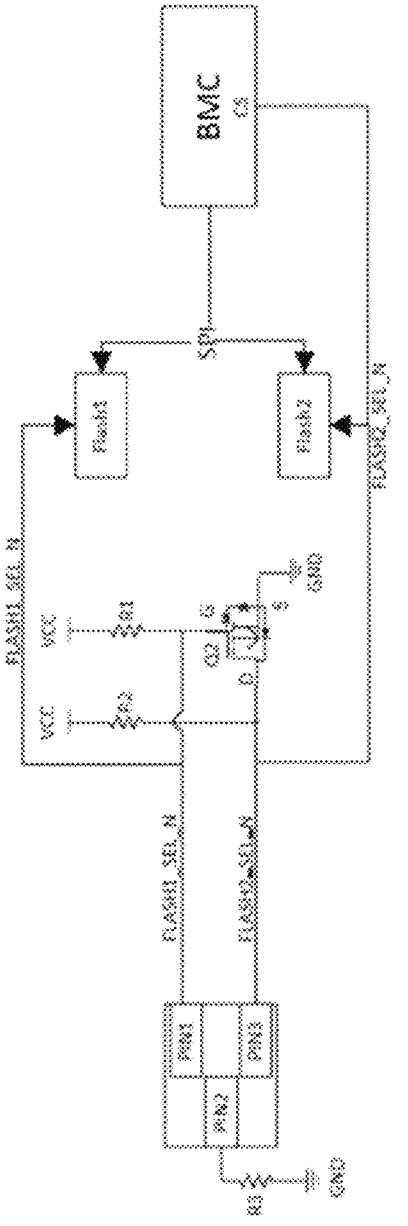
FIG. 3 is a schematic diagram of a structure of another double-Flash switching device according to one or more embodiments of the present application.

In some embodiments, referring to FIG. 3, the insulated-gate-type field-effect transistor is a PMOS transistor Q2;

the gate electrode G of the PMOS transistor Q2 is connected to a power supply by a first resistor R1, the drain electrode D of the PMOS transistor Q2 is connected to the power supply by a second resistor R2, and the source electrode S of the PMOS transistor Q2 is connected to the ground; and the first pin 41 is connected to the gate electrode G of the PMOS transistor Q2, and the third pin 43 is connected to the drain electrode D of the PMOS transistor Q2.

In some embodiments, the target chip 10 has an output pin and an input pin (not shown in the drawings), the output pin is connected to the enabling pin of the second Flash chip and the drain electrode of the PMOS transistor, and the input pin is connected to the jumper cap;

the target chip is configured to detect a state of the jumper cap by using the input pin; and the target chip is further configured to, in response to the jumper cap being pulled out or the second pin being not connected to the first pin or the third pin, output a low-level signal or a high-level signal to the second Flash chip by using the output pin.

In some embodiments, referring to FIG. 2 and FIG. 3, the device further includes a third resistor R3, one end of the third resistor R3 is connected to the third pin 43, and the other end of the third resistor R3 is connected to the ground (GND).

In some embodiments, a magnitude of a resistance value of the third resistor R3 is one hundred ohms to two hundreds ohms.

In some embodiments, the type of the target chip 10 includes one of a baseboard management controller, an integrated south-bridge chip, a graphics card, a network card and an internal memory.

In some embodiments, the firmware in the first Flash chip 20 and the second Flash chip 30 are different.

In another one or more embodiments, referring to FIG. 2 again, in order to facilitate to comprehend the technical solutions of the present application, it will be taken as an example below that the insulated-gate-type field-effect transistor is an NMOS transistor and the target chip is a baseboard management controller of the server, wherein the baseboard management controller is connected to the first Flash chip and the second Flash chip by using a serial peripheral interface (SPI) bus, and the baseboard management controller outputs a high-level signal by default. The particular operating principle of the device is as follows:

1. The jumper cap and its peripheral circuit are added to the mainboard, and the jumper cap is used to, before the powering-on, manually select the starting-up-loaded-firmware source of the baseboard management controller. For example, in FIG. 2, the first resistor R1 and the second resistor R2 may be resistors of 1KΩ-10KΩ, R3 may be a resistor of 100Ω, and Q1 is an NMOS transistor.

2. Before the mainboard is powered on, when the operator chooses to connect the first pin and the second pin by using the jumper cap, the signal FLASH1_SEL_N is a low level, and FLASH2_SEL_N is a high level. Because the enabling signal of the Flash chips is low-effective, the first Flash chip is strobed, and accordingly the baseboard management controller may load the pre-burnt firmware from the first Flash chip.

3. Before the mainboard is powered on, when the operator chooses to connect the second pin and the third pin by using the jumper cap, the signal FLASH1_SEL_N is a high level, and FLASH2_SEL_N is a low level. Because the enabling signal of the Flash chips is low-effective, the second Flash chip is strobed, and accordingly the baseboard management controller may load the pre-burnt firmware from the second Flash chip.

4. If the operator does not connect the jumper cap before the mainboard is powered on or pulls out the jumper cap after the powering-on, at this moment, the first Flash chip is strobed by default, and the baseboard management controller may still make the loading selection of the firmware again by using the enabling signal output by the baseboard management controller, wherein when the enabling signal output by the baseboard management controller is a high level, the first Flash chip is strobed, and when the enabling signal output by the baseboard management controller is a low level, the second Flash chip is strobed.

Furthermore, as corresponding to the cases of the connection of the jumper cap, the principle of the switching of the Flash chips by using the PMOS transistor is similar to the above principle using the NMOS transistor, and is not discussed further herein, and the detailed operation mode and the strobing conditions refer to the above case using the NMOS transistor. It should be particularly noted that, when the PMOS transistor is used, if the jumper cap is not connected, at this moment, if the baseboard management controller outputs a high level by default, neither the first Flash chip nor the second Flash chip is strobed, and if it is intended to switch the Flash chips by that the baseboard management controller outputs the enabling signal, then it is required to combine with the traditional double-Flash switching solution. Therefore, in the process of implementing, the NMOS transistor is preferably used.

In some embodiments, in the double-Flash switching device according to the present application, in the double-Flash switching device stated above, by adding the jumper cap and the insulated-gate-type field-effect transistor, the first pin of the jumper cap is connected to the enabling pin of the first Flash chip, the second pin is connected to ground, the third pin is connected to the enabling pin of the second Flash chip, the two different electrodes of the insulated-gate-type field-effect transistor are connected to the first pin and the third pin, and the insulated-gate-type field-effect transistor is configured to be switched on or switched off to cause the electrical levels connected to the first pin and the third pin to be different, and then the target chip may, based on the connection states of the pins of the jumper cap, load the firmware from the first Flash chip or the second Flash chip. The jumper cap is used to facilitate the operator to voluntarily select the firmware-loading position according to demands, which avoids Flash switching after powering-on, the flexibility of the firmware loading is improved, the risk of starting-up failures caused by errors in firmware loading is reduced, and the chip starting-up duration is shortened.

In some embodiments, by using the double-Flash switching device according to the present application, firstly, it may be set before the powering-on of the machine according to the demands of the operator that the server loads the firmware and starts up from any of the Flash chips, to prevent the inconvenience caused by the switching of the Flash chips after the powering-on of the machine. Secondly, the function of voluntary selection of the source of the loaded firmware after the powering-on is still maintained, and, even if the operator does not select the jumper cap or the jumper cap is damaged, the default firmware may still be loaded. Finally, it is merely required to, based on the original double-Flash starting-up structure, add one jumper cap, the metal-oxide-semiconductor (MOS) transistor and the peripheral devices such as resistors, which has very low influence on the cost, thereby the flexibility of the firmware loading is greatly improved.

In another one or more embodiments, the present application further provides a server, wherein the server includes the double-Flash switching device stated above.

The technical features of the above embodiments may be combined randomly. In order to simplify the description, all of the feasible combinations of the technical features of the above embodiments are not described. However, as long as the combinations of those technical features are not contradictory, they should be considered as falling within the scope of the description.

The above embodiments merely describe some embodiments of the present application, and although they are described particularly and in detail, they cannot be accordingly understood as a limitation to the patent scope of the present application. It should be noted that a person skilled in the art may make some variations and improvements without departing from the concept of the present application, all of which fall within the protection scope of the present application. Therefore, the patent protection scope of the present application should be subject to the appended claims.

The invention claimed is:

1. A double-Flash switching device, comprising:

a target chip;

a first Flash chip and a second Flash chip, wherein the first Flash chip and the second Flash chip are individually burnt with a firmware of the target chip, and are connected to the target chip by using a bus;

a jumper cap, wherein the jumper cap has a first pin, a second pin and a third pin, the first pin is connected to an enabling pin of the first Flash chip, the second pin is connected to ground, and the third pin is connected to an enabling pin of the second Flash chip; and an insulated-gate-type field-effect transistor, wherein two different electrodes of the insulated-gate-type field-effect transistor are connected to the first pin and the third pin, and the insulated-gate-type field-effect transistor is configured to be switched on or switched off to cause the two different electrodes to have different electrical levels; and the target chip is configured to, based on connection states of the first pin, the second pin and the third pin of the jumper cap, load the firmware from the first Flash chip or the second Flash chip;

the insulated-gate-type field-effect transistor is an N-channel metal-oxide-semiconductor NMOS) transistor;

a drain electrode of the NMOS transistor is connected to a power supply by a first resistor, a gate electrode of the NMOS transistor is connected to the power supply by a second resistor, and a source electrode of the NMOS transistor is connected to the ground; and the first pin is connected to the drain electrode of the NMOS transistor, and the third pin is connected to the gate electrode of the NMOS transistor.

2. The double-Flash switching device according to claim 1, wherein the target chip has an output pin and an input pin, the output pin is connected to the enabling pin of the second Flash chip and the gate electrode of the NMOS transistor, and the input pin is connected to the jumper cap;

the target chip is configured to detect a state of the jumper cap by using the input pin; and the target chip is further configured to, in response to the jumper cap being pulled out or the second pin being not connected to the first pin or the third pin, output a low-level signal or a high-level signal to the second Flash chip by using the output pin.

3. The double-Flash switching device according to claim 1, wherein the device further comprises a third resistor, one end of the third resistor is connected to the third pin, and the other end of the third resistor is connected to the ground.

4. The double-Flash switching device according to claim 3, wherein a magnitude of a resistance value of the third resistor is one hundred ohms to two hundreds ohms.

5. The double-Flash switching device according to claim 1, wherein a type of the target chip comprises one of a baseboard management controller, an integrated southbridge chip, a graphics card, a network card and an internal memory.

6. The double-Flash switching device according to claim 5, wherein when the jumper cap is used to connect the first pin and the second pin, the baseboard management controller loads the firmware from the first Flash chip.

7. The double-Flash switching device according to claim 5, wherein when the jumper cap is used to connect the second pin and the third pin, the baseboard management controller loads the firmware from the second Flash chip.

8. The double-Flash switching device according to claim 5, wherein when the jumper cap is not used, the baseboard management controller is still capable of making loading selection of the firmware by using an enabling signal output by the baseboard management controller.

9. The double-Flash switching device according to claim 8, wherein when the enabling signal output by the baseboard management controller is a high level, the first Flash chip is strobed; and when the enabling signal output by the baseboard management controller is a low level, the second Flash chip is strobed.

10. The double-Flash switching device according to claim 1, wherein the firmwares in the first Flash chip and the second Flash chip are different.

11. A server, wherein the server comprises a double-Flash switching device comprising:

a target chip;

a first Flash chip and a second Flash chip, wherein the first Flash chip and the second Flash chip are individually burnt with a firmware of the target chip, and are connected to the target chip by using a bus;

a jumper cap, wherein the jumper cap has a first pin, a second pin and a third pin, the first pin is connected to an enabling pin of the first Flash chip, the second pin is connected to ground, and the third pin is connected to an enabling pin of the second Flash chip; and an insulated-gate-type field-effect transistor, wherein two different electrodes of the insulated-gate-type field-effect transistor are connected to the first pin and the third pin, and the insulated-gate-type field-effect transistor is configured to be switched on or switched off to cause the two different electrodes to have different electrical levels; and the target chip is configured to, based on connection states of the first pin, the second pin and the third pin of the jumper cap, load the firmware from the first Flash chip or the second Flash chip;

the insulated-gate-type field-effect transistor is an N-channel metal-oxide-semiconductor (NMOS) transistor;

a drain electrode of the NMOS transistor is connected to a power supply by a first resistor, a gate electrode of the NMOS transistor is connected to the power supply by a second resistor, and a source electrode of the NMOS transistor is connected to the ground; and the first pin is connected to the drain electrode of the NMOS transistor, and the third pin is connected to the gate electrode of the NMOS transistor.

12. The server according to claim 11, wherein the target chip has an output pin and an input pin, the output pin is connected to the enabling pin of the second Flash chip and the gate electrode of the NMOS transistor, and the input pin is connected to the jumper cap;

the target chip is configured to detect a state of the jumper cap by using the input pin; and the target chip is further configured to, in response to the jumper cap being pulled out or the second pin being not connected to the first pin or the third pin, output a low-level signal or a high-level signal to the second Flash chip by using the output pin.

13. The server according to claim 11, wherein the device further comprises a third resistor, one end of the third resistor is connected to the third pin, and the other end of the third resistor is connected to the ground.

14. A chassis, wherein the chassis comprises a double-Flash switching device comprising:

a target chip;

a first Flash chip and a second Flash chip, wherein the first Flash chip and the second Flash chip are individually burnt with a firmware of the target chip, and are connected to the target chip by using a bus;

a jumper cap, wherein the jumper cap has a first pin, a second pin and a third pin, the first pin is connected to an enabling pin of the first Flash chip, the second pin is connected to ground, and the third pin is connected to an enabling pin of the second Flash chip; and an insulated-gate-type field-effect transistor, wherein two different electrodes of the insulated-gate-type field-effect transistor are connected to the first pin and the third pin, and the insulated-gate-type field-effect transistor is configured to be switched on or switched off to cause the two different electrodes to have different electrical levels; and the target chip is configured to, based on connection states of the first pin, the second pin and the third pin of the jumper cap, load the firmware from the first Flash chip or the second Flash chip;

the insulated-gate-type field-effect transistor is an N-channel metal-oxide-semiconductor (NMOS) transistor;

a drain electrode of the NMOS transistor is connected to a power supply by a first resistor, a gate electrode of the NMOS transistor is connected to the power supply by a second resistor, and a source electrode of the NMOS transistor is connected to the ground; and the first pin is connected to the drain electrode of the NMOS transistor, and the third pin is connected to the gate electrode of the NMOS transistor.

* * * * *